Sept. 2, 1941.  C. B. MOORE  2,254,621
PNEUMATIC CONTROL DEVICE
Filed Aug. 14, 1937  2 Sheets-Sheet 1

INVENTOR.
COLEMAN B. MOORE
BY George W. Munselbourg
ATTORNEY

Sept. 2, 1941.　　　C. B. MOORE　　　2,254,621
PNEUMATIC CONTROL DEVICE
Filed Aug. 14, 1937　　　2 Sheets-Sheet 2

INVENTOR.
COLEMAN B. MOORE
BY George W. Muschamp
ATTORNEY

Patented Sept. 2, 1941

2,254,621

UNITED STATES PATENT OFFICE 2,254,621

PNEUMATIC CONTROL DEVICE

Coleman B. Moore, Carroll Park, Pa., assignor to The Brown Instrument Company, Philadelphia, Pa., a corporation of Pennsylvania Application August 14, 1937, Serial No. 159,202

10 Claims. (Cl. 236—21)

The present invention relates to control instruments, and particularly to a control instrument such as one commonly known as an air controller, in the use of which it is desirable to supplement the main control action or effect by a safety or special control effect, such as the actuation of an alarm signal, or the closure of a cut-off valve, under certain abnormal conditions which may develop from time to time. For example, in the operation of an air controller, a safety control effect may be desirable on a failure of the means for supplying air under pressure to the air controller, and, in some cases, when the operating conditions are such as to tend to require the instrument to produce a main control effect differing substantially in magnitude from effects required with normal operating conditions.

The general object of the present invention is to provide a control instrument with novel and effective means for producing special control actions of the character above mentioned. A more specific object of the invention is to provide an air controller, with effective air actuated means for producing a safety control effect by adjusting an electric control switch between open and closed positions, on a failure in the means supplying air under pressure to the instrument, or upon development of an instrument operating condition producing, or tending to produce, an abnormal main control action.

In the preferred practical form of the present invention, hereinafter described in detail, an air controller of commercial type, including a main instrument air valve, is provided with a mercury control switch, a pneumatic device for tilting the switch, and controlling means for said device comprising nozzle and flapper air valve elements relatively adjusted to actuate said device and thereby tilt said switch, on an abnormal adjustment in one direction of the main air valve of the instrument, said switch, device and the control means for the latter being compact and all mounted within the casing ordinarily employed to house said commercial air controller.

The various features of novelty which characterise my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
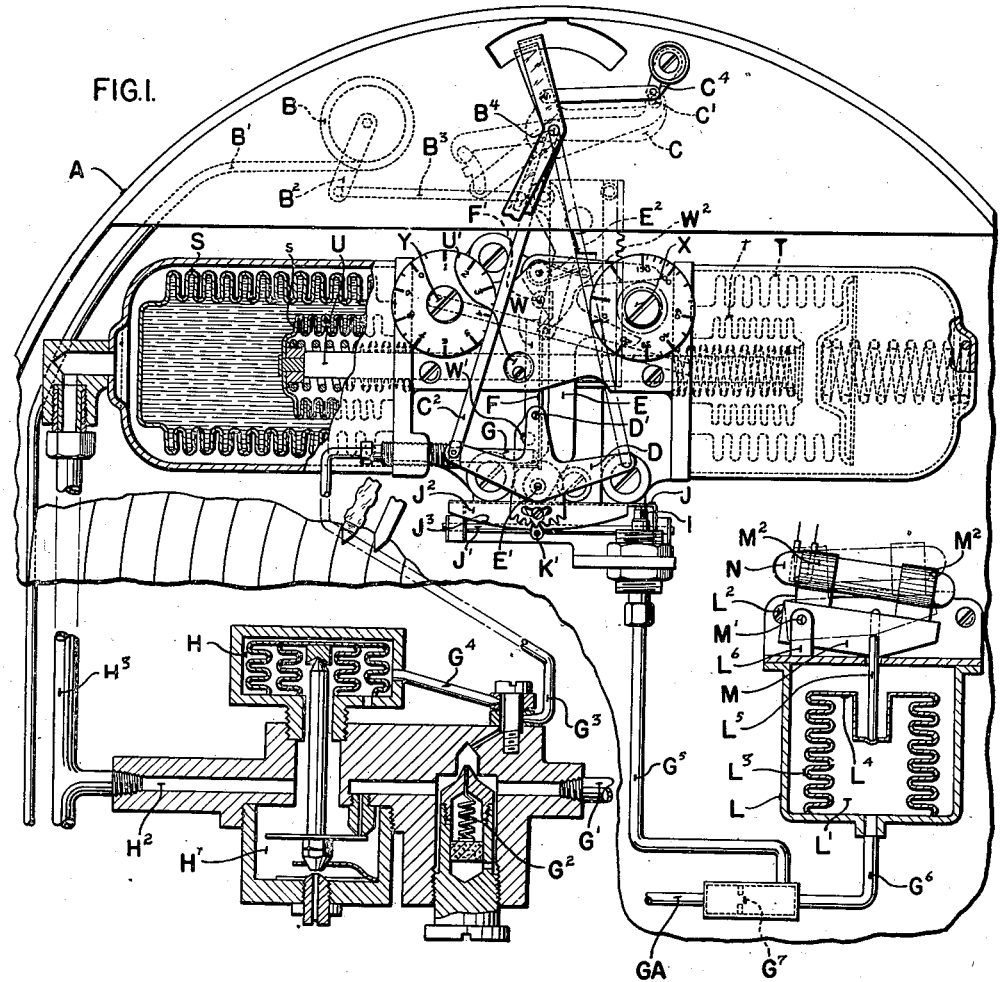
Fig. 1 is an elevation with parts broken away and removed, of an air controller of commercial type provided with safety means in accordance with the present invention.
Figure 4:
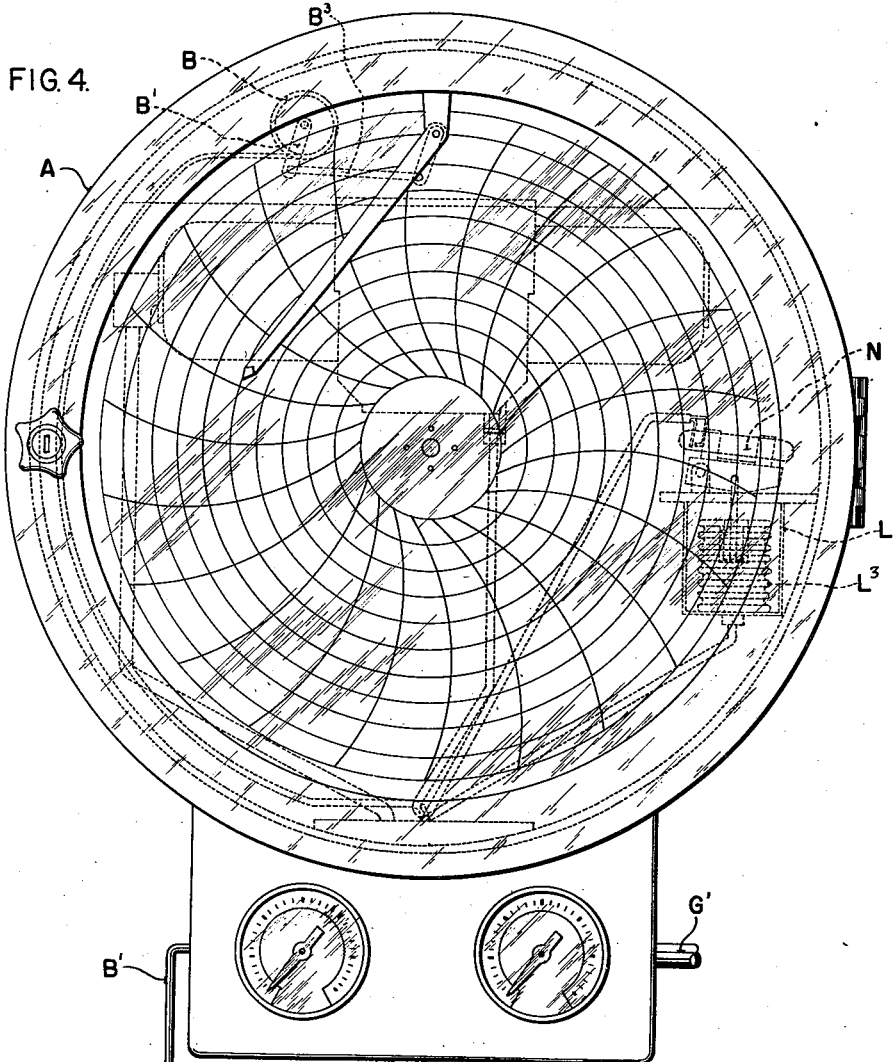
Fig. 4 is a front elevation of the control instrument shown in part in Fig. 1, combined with a diagrammatic representation of an oil heater furnace controlled by said instrument.

In respect to its general features, the control instrument A shown in Figs. 1 and 4 is of the type and form now in extensive commercial use and known as the "Air-O-Line controller," and is constructed in substantial accordance with the disclosure in Patent No. 2,125,081, granted July 26, 1938, on my prior application, filed October 4, 1935. The instrument comprises a device B, responsive to the controlling condition to which the instrument is to respond, and shown as a Bourdon tube B, which angularly adjusts an arm $B^2$ as the pressure transmitted to the tube by a pipe B' increases and decreases. The angular movements of the arm $B^2$ operate through a link $B^3$ and an element oscillating about an axis $B^4$ to turn a lever C about its fulcrum axis $C^1$ in one direction or the other. The clockwise and counterclockwise adjustments of the lever C give up and down movements, respectively, to a link $C^2$, which is connected at its upper end to the lever C and is connected at its lower end to a lever D.

The latter is supported on a pivot pin E' carried by a fulcrum lever E. The latter is pivoted to turn about a stationary pivot pin $E^2$, in effecting follow-up and compensating adjustments to which further reference will be made herein. At this point, it is noted merely that the lever D acts on a flapper valve F through a pin D' carried by the lever and laterally displaced from the pivot E', and that the effect on the flapper valve of clockwise and counter clockwise adjustments of the lever D, produced by up and down adjustments of the link $C^2$, are respectively similar in direction to the effects on the flapper valve produced by counterclockwise and clockwise movements of the lever E about its supporting pivot $E^2$. The flapper valve F is pivoted at F'' and is biased for movement in the clockwise direction toward the open end of the bleeder orifice or port in a nozzle member G, which with the flapper F, forms the main control valve of the instrument. The nozzle member G is connected to a pipe G¹ supplying air under pressure for the operation of the control instrument, by a pipe G³ and a restricted flow passage, which, as shown, is formed by the bore of a capillary tube G².

The pressure in the nozzle G and pipe G³ depends upon the throttling effect of the flapper valve F, and increases and decreases as that valve is moved toward and away from the nozzle G. The nozzle pressure is transmitted by a pipe G⁴ to the pressure chamber H of a pilot valve mechanism. The latter comprises a chamber H' communicating with the supply pipe G' and with the atmosphere, through inlet and bleeder or vent ports variably throttled in response to pressure variations in the chamber H, as required to maintain a constant ratio between the pressures in the chambers H and H'. The pressure in the chamber H' is transmitted by a pipe H² to the regulator or control device external to the control instrument through which the latter produces its control effect.

Figure 3:
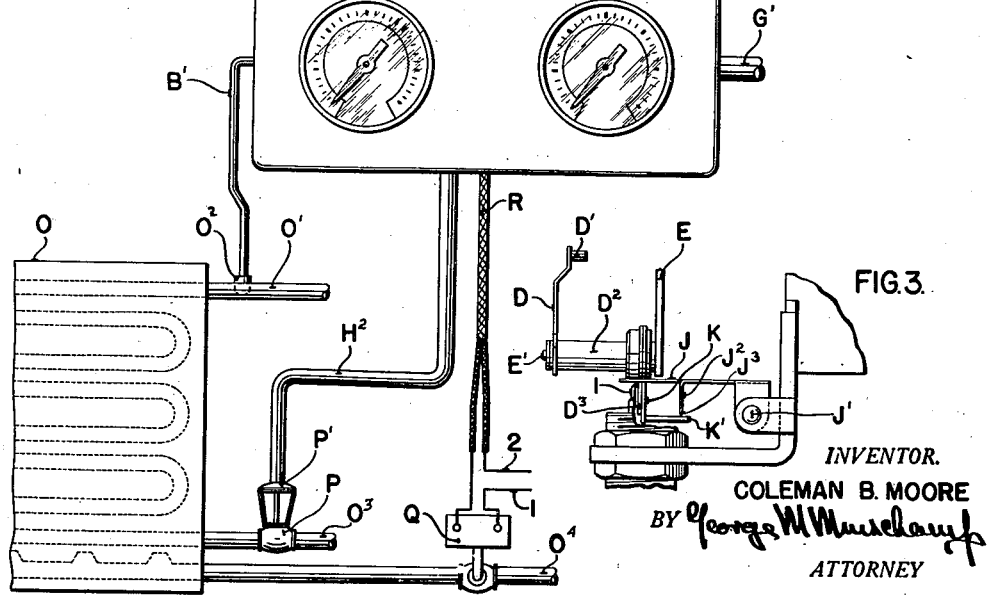
Fig. 3 is an elevation, taken at right angles to Fig. 2 and showing the same apparatus.

For the purpose of the present invention, I mount within the housing of the instrument A, a second or safety control valve mechanism. That mechanism in the form shown, comprises a bleeder orifice nozzle I and a cooperating flapper valve J, the latter being formed of sheet metal with ear portions apertured for the passage of a pivot pin J' by which the flapper valve J is pivotally connected to the instrument framework. The axis of pivot J' is transverse to and laterally displaced from the axis of the nozzle I, so that the bleeder passage through the nozzle I may be subjected to decreased and increased throttling effects by clockwise and counterclockwise movements of the valve J, as seen in Fig. 3. As shown, the nozzle I is connected to a compressed air supply pipe GA by means including a pipe G⁵, and a restricted orifice G⁷. Normally the pipe GA receives air from the same source as the pipe G'.

The valve J has a gravitational bias for adjustment counterclockwise, as seen in Fig. 3, into its closed position. As shown, means are provided for automatically adjusting the valve J in the opening direction in response to an abnormal or unusual increase or decrease in the pressure transmitted to the Bourdon B, through the lever D. The said means comprises a part K which is connected to the lower end of lever D so as to normally share the angular movements of the latter about its fulcrum pivot E', and preferably is connected to said lever by a friction clutch, or by other means permitting relative angular adjustments of the part K and lever D to be readily effected. As shown, a hub portion D² of the lever D carries a part D³. The latter and the member K have engaging surfaces extending transversely to the axis of the pivot E'. As shown, a clamping screw KD tapped into the member K extends through a curved slot formed in the part D² and through a spring washer KD' so that by tightening up the screw KD, the parts D³ and K may be more or less positively clamped together in any desired relative angular position. To facilitate the adjustment of that relative position, the part D³ is formed with teeth D⁴, between one or another of which, and an adjacent portion of part K, a screw driver may be inserted to cam, or pry, the engaged tooth away from the engaged portion of the part K.

The part K carries a transverse pin K', adapted on a suitable adjustment of the part K' angularly about pivot E', to engage the edge J³ of a transverse flange portion J² of the valve J, and thereby give an opening adjustment to said valve. To make the operation of the valve J independent of the angular position of the fulcrum lever E for the lever D, the edge J³ is shaped to extend circularly about the axis of the pivot E² on which the member E is supported.

Figure 2:
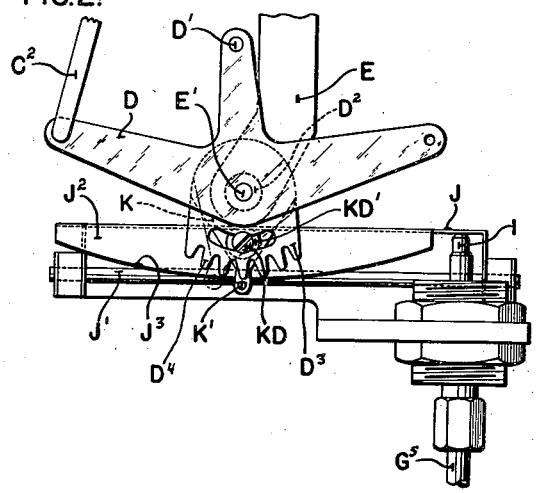
Fig. 2 is an enlarged view of a portion of the apparatus shown in Fig. 1.

With the apparatus adjusted so that with the average value of the controlling condition, the axes of the pins E², E' and K' are all in the same plane as shown in Figs. 1 and 2, the maximum angular movement of the lever D about the pivot E' occurring in regular operation, will be insufficient to give a significant opening adjustment to the valve J. However, an angular adjustment of the member K about the axis of pin E' relative to the member D, displacing pin K' sufficient to one side of the plane including the axes of the pivots E' and E², will adapt the pin K' to give a significant opening adjustment to the valve J on movement of the lever D into a position within its regular operating range of movement. For example, if the member K is adjusted into its dotted line position shown in Fig. 2, a clockwise adjustment of the member D, less than that required to entirely destroy the throttling effect of the flapper valve F on the flow through nozzle G, will give the valve J an opening movement sufficient to substantially reduce the normal pressure in the nozzle I.

In the construction shown, the nozzle I pressure, i. e., the pressure at the outlet side of the restricted orifice G⁷, is transmitted by the pipe G⁶ to the expansible chamber L' of a pneumatic switch actuating mechanism L suitably mounted in the casing of the instrument A, as by means of screws L² securing the rigid housing of the device L against the back wall of the instrument casing. The chamber L' is surrounded by a bellows element L³ secured at one end to one end wall of the housing of the device L. The movable head L⁴ secured to the opposite end of the bellows L³, is connected by a connecting rod or link L⁵, to a mercury switch support M, the latter is pivotally supported by a pivot pin M', journalled in ears L⁶ carried by the housing of the device L. Mounted on the support M is a mercury switch N, the latter, as shown, being held in spring arms or clips M² carried by the support M.

With the member K adjusted into its dotted line position shown in Fig. 2, for example, and with the angular position of the member D that required to maintain a pressure in the nozzle G above the minimum contemplated, the valve J will be closed. With the valve J closed, and with air supplied to the pipe GA at the normal supply pressure, the bellows L³ will be elongated by said pressure sufficiently to hold the switch N in its closed position, shown in dotted lines in Fig. 1. The fact that the valve J is closed will not prevent the bellows L³ from collapsing and opening the switch N, whenever the pressure of the air supplied to the instrument diminishes so that the instrument is not effective to perform its main control duties, this safety action being effected regardless of the position of the lever D, or the adjustment of the member K.

As will be apparent, control instruments including the invention disclosed herein, can be used in different ways and for many different purposes. In the arrangement shown by way of illustration and example in Fig. 4, the pressure transmitted to the Bourdon B² through the pipe $B^1$ is the pressure in a fluid pressure thermometer bulb. The latter is arranged to be responsive to or measure the temperature in the oil outlet $O^2$ of a tube still or oil heater O. The main control pressure of the instrument A is transmitted by the pipe $H^2$ to the pressure chamber $P'$ of a pressure motor valve or regulator P, throttling the oil inlet $O^3$ of the heater O. The normal, main control action of the instrument B thus serves to vary the heater oil through put, as required to maintain a constant exit oil temperature. As shown in Fig. 4, the special or safety control mechanism is employed to cut off the supply of fuel to the burner supply pipe $O^4$ of the heater O, on the development of an abnormal condition resulting in the adjustment of the switch N into its open position.

In the arrangement shown, the supply of fuel to the heater is cut off, when the switch N opens, by an electrically operated valve Q. The latter may be of a known commercial type, biased for movement into its closed position but including electrical means which, when energized, holds the valve open. Said means are energized, when the switch N is in its closed position, by supply conductors 1 and 2 through conductors connected to the contacts of the switch N and enclosed in a cable R. Thus when the switch N is tilted into its closed position, the valve Q is wide open, and the performance of the oil heater $O^2$ is then subject to the control effected by the instrument A through the flapper F and nozzle G, in response to the exit oil temperature. On an abnormal variation in that temperature resulting in an opening adjustment of the valve J, or on a failure in the compressed air supply to the instrument A, the bellows L will collapse and open the switch N and thereby close the valve Q and interrupt the supply of fuel to the burner of the heater O.

The follow up and compensating provisions of the commercial air controller illustrated, comprise an opposing pair of small bellows elements $s$ and $t$, having their movable ends connected by a stem or rod U, and two large bellows elements S and T. The four bellows elements are coaxial, and the bellows S surrounds the bellows $s$, and the bellows T surrounds the bellows $t$. The inter-bellows space between the elements S and $s$, is filled with liquid and is in restricted communication with the liquid containing inter-bellows space between the elements T and $t$. The bellows S is located within a chamber to which the pipe $H^3$ opens so that the bellows S is externally subjected at all times to the main instrument control pressure.

The connecting rod U acts through a cam part $U'$ carried by the rod, and through a thrust lever W pivoted at $W'$, and an adjustable thrust pin $W^2$, to adjust the lever E about its supporting pivot $E^2$. On a movement of the rod U to the right, as seen in Fig. 1, the lever E is given a counterclockwise adjustment, and on a movement of the rod to the left, the lever E is permitted a counterclockwise adjustment under the action of a bias spring. By rotation of an adjusting device X, the pin $W^2$ can be adjusted in a direction transverse to the length of the rod U, to thereby vary the leverage with which the rod U acts on the lever E. By adjustment of a second rotatable adjusting device Y, communication between the two above mentioned inter-bellows spaces may be variably restricted.

The effect of the last mentioned adjustment is to vary the time required to effect a compensating or reset adjustment, and the leverage adjustment effected by rotation of the device varies the extent or magnitude of any particular follow up adjustment.

The term "follow up adjustment" as used herein, means an adjustment of the flapper F, which results from, and follows, and partially neutralizes, adjustments of the flapper F, resulting from changes in the pressure transmitted to the Bourdon tube B. The effect of a compensating or reset adjustment mentioned above, is to slowly neutralize a preceding follow up adjustment effect. As explained in my prior application above mentioned, the capillary tube $G^2$ is mounted in a valve member Z which may be manually adjusted to open and variably throttle a by-pass about the capillary tube $G^2$ between the pipes $G^1$ and $G^3$, and thus forms a means by which the pressure in the pilot valve chamber H, and consequently in the chamber $P'$ of the heater control valve P, may be manually controlled.

The special, or safety, provisions disclosed and claimed herein, are adapted for use in control instruments of widely different forms, and, in particular, are adapted for use in air controllers which have none of the follow up, compensating, and adjustment features mentioned above.

Specifically it is noted that the edge $J^3$, being formed in an arc about the pivot $E^2$, permits follow up and compensating adjustments to take place without altering the relation between itself and the pin $K'$ in respect to the point of operation of the safety means on a predetermined temperature rise above or fall below a given value thereof. When the apparatus is arranged as shown in full lines in Fig. 1, in which link $C^2$ is attached to the left-hand arm of lever D, a rising movement of link $C^2$ will result in a decrease in pressure on the valve P. In an alternative arrangement, as shown in dotted lines, the link $C^2$ is shifted to the right-hand arm of lever D and a rising movement of the link will result in an increase in pressure on the valve P. Whether the link $C^2$ is arranged in its dotted line position or in its full line position, will depend on the type of valve used (pressure opening or pressure closing), and the process controlled. If link $C^2$ is arranged in the full line position, the adjustment of pin $K'$ relative to the part $D^3$ in order to predetermine the critical point of operation of switch N, will be wholly to the left of a plane including the axes of pivots $E'$ and $E^2$ but with link $C^2$ in the alternative dotted line position, the adjustment of pin $K'$ will be to the right of said plane. A member J with the part $J^2$ configured as shown is employed with a device having either or both of said follow up or compensating provisions but if both those provisions are eliminated and the pivot $E'$ is relatively stationary in the position shown in Fig. 2, the arcuate configuration of the edge $J^2$ is unnecessary, and may be any suitable shape which will permit the relative adjustment of parts $K'$ and $D^3$ to vary the point in the angular travel of lever D at which pin $K'$ will engage and move flapper J, and will permit this operation to take place with link $C^2$ in either of its alternate positions.

Figure 5:
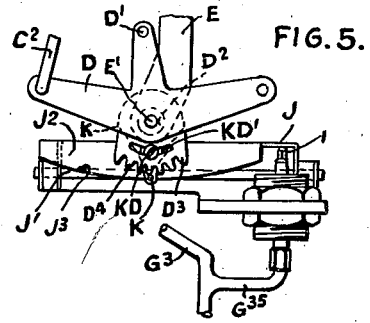
Fig. 5 is an elevation illustrating a modification of a portion of the apparatus shown in Fig. 1.

It is noted that the means disclosed for performing the safety operation may be useful in itself and independently of the air control provisions with which it is herein illustrated. I may, furthermore, attain the cut off effect desired, which in some installations is sufficient, without making use of a separate cut off means such as the valve Q, and the associated operating mechanism including device L and switch N. Thus the air controller shown in Fig. 1 may be modified by eliminating the pipe G⁵ and parts associated by that pipe with the orifice nozzle I, and by connecting the latter through a pipe G³⁵ as shown in Fig. 5, to the pipe G³. When so modified, the normal air controller device will function to control the valve P as necessary to maintain the latter in partially open position suitably related to the value of the exit oil temperature, but on the attainment of a predetermined maximum temperature resulting in actuation of flapper J, the pressure in chamber H will immediately be decreased so as to adjust valve P to its limit in the desired direction. The port area of nozzle I relative to the port area of nozzle G is suitably large so that the position of flapper F with respect to the latter is immaterial when the opening operation of flapper J takes place. In the form of my invention including the arrangement shown in Fig. 5, as in the form shown in Figs. 1-4, the value of the controlling condition, namely, the temperature in the oil outlet O², is regulated by corrective means subject to the control of the valve mechanism including the flapper valve F, and to control by means independent of that valve mechanism and comprising the valve member J. The term "corrective means" as used herein, is intended to generically apply to the control device P when the later is subject to direct control both by the valve mechanism including the flapper valve F, and by the valve mechanism including the valve J, as it is in the form of my invention including the arrangement of Fig. 5; and to generically include both the valve P and the valve Q, when one of those valves is actuated by one, and the other is actuated by the second of the two valve mechanisms, as they are in the form of my invention illustrated in Figs. 1-4.

It is a practically important characteristic advantage of my invention, that said special or safety control provisions are adapted for use with advantage in the highly efficient and effective type of air controller shown, and are sufficiently compact to permit them to be incorporated in the instrument casing of standard design, ordinarily employed as the casing of said commercial type of air controller.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a control instrument, the combination of an element responsive to a controlling condition, a main control device adapted to effect a regulating action regulating the value of said condition, pneumatic means through which said element adjusts said device, a switch adapted when actuated to modify the effect on said condition value of said regulating action, an air controller valve, a pneumatic switch actuator controlled by adjustment of said valve, and means through which said valve is adjusted by the first mentioned means when said controlling condition attains a predetermined value.

2. In a control instrument, the combination of an element responsive to a controlling condition, a main control device adapted to effect a regulating action regulating the value of said condition, pneumatic means through which said element adjusts said device, a switch adapted when actuated to modify the effect on said condition value of said regulating action, a source of air under pressure supplying air to energize said means, a pneumatic switch actuator normally subjected to the pressure of air supplied by said source and biased for switch actuation in one direction on a reduction in the pressure to which it is subjected, a valve adapted when adjusted to reduce the pressure to which said switch actuator is subjected, and means through which said valve is adjusted by the first mentioned means when said controlling condition attains a predetermined value.

3. In an air controller instrument, the combination of an element responsive to a controlling condition, a main air controller valve, means through which said element adjusts said valve, a source of air under pressure connected to said valve, a pneumatic switch actuator normally subjected to the pressure of air supplied by said source and biased for switch actuation in one direction on a reduction in the pressure to which it is subjected, a second valve adapted when adjusted to reduce the air pressure to which said switch actuator is subjected, and means through which said second valve is adjusted by the first mentioned means when said controlling condition attains a predetermined value.

4. In an air controller instrument, the combination with an instrument casing, of mechanism within said casing comprising an element responsive to a controlling condition, a main flapper valve, means through which said element adjusts said valve, a source of air under pressure, a restricted orifice through which said source is connected to said flapper valve, a chamber adapted to expand and contract on an increase and decrease, respectively, in the pressure in said chamber, a connection including a restricted orifice between said source and chamber, a normally closed flapper valve connected to the last mentioned connection between said chamber and source, a two position safety switch moved into one or another of its position by the expansion or contraction, respectively, of said chamber, and means through which the last mentioned flapper valve is opened by the first mentioned means when said controlling condition attains a predetermined value.

5. In an air controller instrument, the combination with a fulcrum lever pivoted to turn about an axis, of a valve operating lever pivotally connected to said fulcrum lever to turn about a second axis displaced from the first mentioned axis and having first and second valve engaging parts, a main flapper valve actuated by adjustment of said first engaging part, means for adjusting said lever about said second axis in accordance with variations in a controlling condition, a second flapper valve, and a pneumatic switch actuating device controlled by the adjustment of the last mentioned valve, the latter having an engaging part engaged and actuated by said second engaging part on a predetermined angular adjustment of said operating lever about said second axis and being unaffected by changes in position of said second engaging part resulting from adjustment of said fulcrum lever about the first mentioned axis.

6. In an air controller instrument, the combination with a fulcrum lever pivoted to turn about an axis, of a valve operating lever pivotally connected to said fulcrum lever to turn about a second axis displaced from the first mentioned axis and having first and second valve engaging parts, a main flapper valve actuated by adjustment of said first engaging part, means for adjusting said lever about said second axis in accordance with variations in a controlling condition, a second flapper valve, and a pneumatic switch actuating device controlled by the adjustment of the last mentioned valve, the latter having an engaging part engaged and actuated by said second engaging part on a predetermined angular adjustment of said operating lever about said second axis, said second valve engaging part being angularly adjustable about said second axis relative to said operating lever.

7. In a pneumatic control instrument, a valve mechanism, means adapted to adjust said valve mechanism in response to changes in a variable condtion, means responsive to said valve mechanism adjustment to further adjust said valve mechanism, corrective means under control of said valve mechanism, and means independent of said valve mechanism to actuate said corrective means on attainment of a predetermined value of said condition.

8. The combination of claim 7 in which said independent means includes a second valve mechanism.

9. The combination of claim 7 in which said independent means includes a second valve mechanism, a switch operated thereby and a device controlled by said switch.

10. In a control instrument, the combination with pneumatic means normally operative to control a variable condition, and comprising means responsive to said variable condition and a condition controlling device actuated by said condition responsive means, a valve mechanism supplied with air under pressure and actuated by said condition responsive means, a pressure motor controlled by said valve mechanism, an electrical switching device actuated by said motor on the attainment by said condition of a predetermined value, and control means additional to said controlling device and actuated on the actuation of said switching device to control said condition.

COLEMAN B. MOORE.